(12) United States Patent
Rheaume

(10) Patent No.: US 11,648,509 B2
(45) Date of Patent: May 16, 2023

(54) PROCESS WATER GAS MANAGEMENT OF INERT GAS GENERATION ELECTROLYZER SYSTEM WITH GAS-ACTIVATED VALVE

(71) Applicant: Hamilton Sundstrand Corporation, Charlotte, NC (US)

(72) Inventor: Jonathan Rheaume, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 762 days.

(21) Appl. No.: 16/593,703

(22) Filed: Oct. 4, 2019

(65) Prior Publication Data

US 2021/0101109 A1    Apr. 8, 2021

(51) Int. Cl.
*B01D 53/32* (2006.01)
*C25B 9/73* (2021.01)
(Continued)

(52) U.S. Cl.
CPC ....... *B01D 53/326* (2013.01); *B01D 19/0063* (2013.01); *B64D 37/32* (2013.01); *C25B 1/04* (2013.01); *C25B 9/73* (2021.01); *C25B 15/02* (2013.01); *C25B 15/08* (2013.01); *A62C 3/08* (2013.01)

(58) Field of Classification Search
CPC ................................. B01D 53/266; C25B 1/04
See application file for complete search history.

(56) References Cited

U.S. PATENT DOCUMENTS 2,208,352 A     7/1940  Pichler-Tennenberg
4,317,046 A *   2/1982  Holmberg ................. F03G 3/00
                                                204/DIG. 6
(Continued)

FOREIGN PATENT DOCUMENTS

JP      H05273436 A      10/1993
WO      2018084117 A1     5/2018

OTHER PUBLICATIONS

"Automatic Air Release, Degassing, and Venting Valves"; Air Release and Degassing Valves; Plast-O-Matic Valves, Inc.; Retrieved Online from https://plastomatic.com/venting-valves.html on Aug. 22, 2019; 2 Pages.
(Continued)

*Primary Examiner* — Ciel P Contreras
(74) *Attorney, Agent, or Firm* — Cantor Colburn LLP

(57) ABSTRACT

A system and method for inerting a protected space is disclosed. Process water is delivered to an anode of an electrochemical cell comprising the anode and a cathode separated by a separator comprising a proton transfer medium. A portion of the process water is electrolyzed at the anode to form protons and oxygen, and the protons are transferred across the separator to the cathode. Process water is directed through a process water fluid flow path including a gas outlet and a gas discharge valve in operative fluid communication with the gas outlet. Air is delivered to the cathode and oxygen is reduced at the cathode to generate oxygen-depleted air, and the oxygen-depleted air is directed from the cathode of the electrochemical cell along an inerting gas flow path to the protected space.

13 Claims, 7 Drawing Sheets

(51) Int. Cl.
*B01D 19/00* (2006.01)
*B64D 37/32* (2006.01)
*C25B 1/04* (2021.01)
*C25B 15/08* (2006.01)
*C25B 15/02* (2021.01)
*A62C 3/08* (2006.01)

(56) References Cited

U.S. PATENT DOCUMENTS

| | | |
|---|---|---|
| 7,481,238 B2 | 1/2009 | Ramoth |
| 9,623,981 B2 | 4/2017 | Darling et al. |
| 9,963,792 B2 | 5/2018 | Rheaume |
| 2005/0087231 A1 | 4/2005 | Sanders et al. |
| 2010/0294969 A1 | 11/2010 | McGuiness |
| 2012/0103435 A1 | 5/2012 | Laskaris |
| 2017/0167037 A1 | 6/2017 | Rheaume |
| 2017/0326327 A1* | 11/2017 | Reeh .................. A61M 16/101 |
| 2017/0331131 A1 | 11/2017 | Rheaume |
| 2018/0001124 A1 | 1/2018 | Klassen et al. |
| 2018/0050300 A1 | 2/2018 | Rheaume et al. |
| 2019/0100844 A1* | 4/2019 | Bahar .................. C09D 127/22 |
| 2020/0318249 A1 | 10/2020 | Rheaume |

OTHER PUBLICATIONS

"Combination Air Release / Degassing Valve"; Series Card Provides Three Different Venting Fnctions; Plast-O-Matic; 2015; 4 Pages.
"Liquid-Gas Mixture Centrifugal Pumps"; Standard and Multiphase Gas-Liquid Mixture Centrifugal Pumps; Shanley Pump and Equipment, Inc.; Retrieved Online from http://www.shanleypump.com/gas-liquid_mixture_pumps.html on Aug. 22, 2019; 3 Pages.
Smolinka; "PEM Water Electrolysis—Present Status of Research and Development"; Review Lecture—Session HP.3d; Fraunhofer-Institut fur Solare Energiesysteme ISE; 18th World Hydrogen Energy Conference 2010 Essen; May 18, 2010; 23 Pages.
Extended European Search Report issued in Application No. 19212116.8 dated May 20, 2020, 7 pages.

* cited by examiner

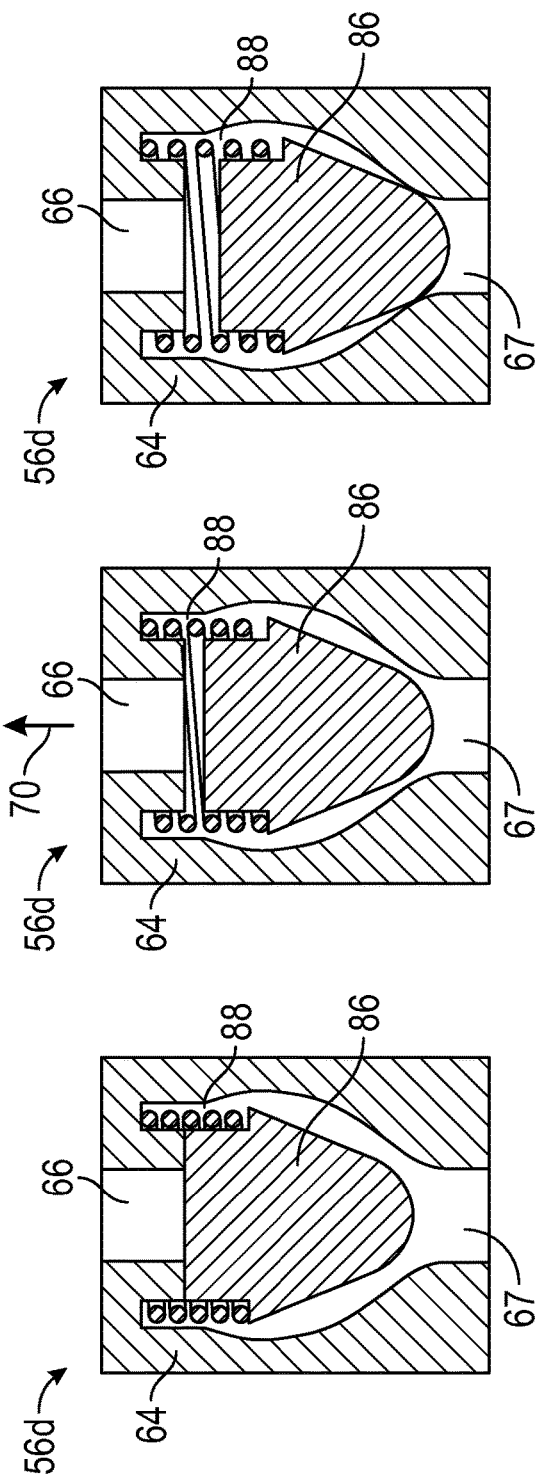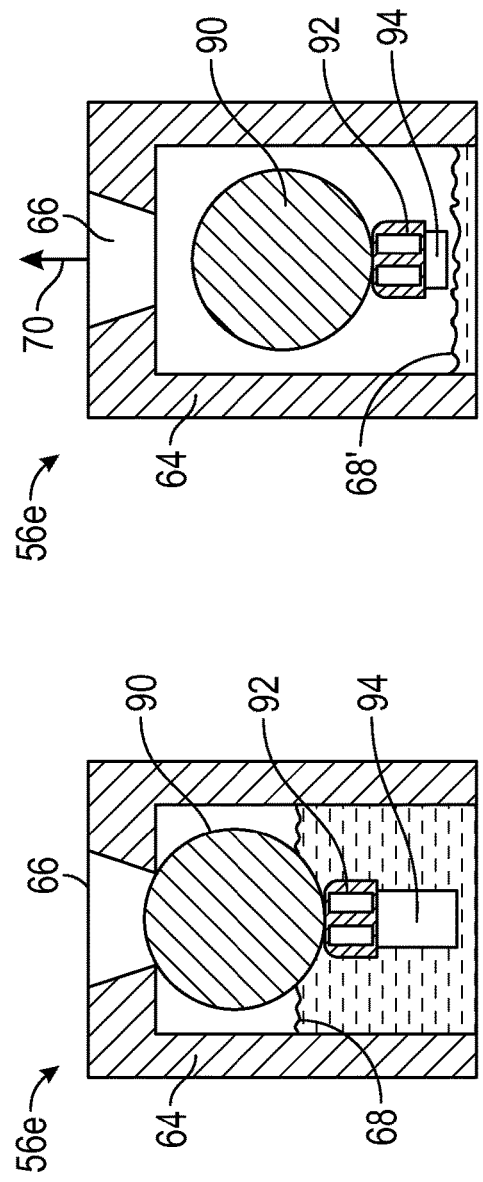

PROCESS WATER GAS MANAGEMENT OF INERT GAS GENERATION ELECTROLYZER SYSTEM WITH GAS-ACTIVATED VALVE

BACKGROUND

The subject matter disclosed herein generally relates to systems for generating and providing inert gas, oxygen, and/or power on vehicles, and more specifically to gas management of such systems.

It is recognized that fuel vapors within fuel tanks become combustible or explosive in the presence of oxygen. An inerting system decreases the probability of combustion or explosion of flammable materials in a fuel tank by maintaining a chemically non-reactive or inert gas, such as nitrogen-enriched air, in the fuel tank vapor space, also known as ullage. Three elements are required to initiate combustion or an explosion: an ignition source (e.g., heat), fuel, and oxygen. The oxidation of fuel may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of oxidation of fuel by reducing the oxygen concentration by introducing an inert gas such as nitrogen-enriched air (NEA) (i.e., oxygen-depleted air or ODA) to the ullage, thereby displacing oxygen with a mixture of nitrogen and oxygen at target thresholds for avoiding explosion or combustion.

It is known in the art to equip vehicles (e.g., aircraft, military vehicles, etc.) with onboard inert gas generating systems, which supply nitrogen-enriched air to the vapor space (i.e., ullage) within the fuel tank. It is also known to store inert gas such as Halon onboard for fire suppression systems. In the case of nitrogen-enriched air, the nitrogen-enriched air has a substantially reduced oxygen content that reduces or eliminates oxidizing conditions within the fuel tank. Onboard inert gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and nitrogen-enriched air (NEA) on the high-pressure side of the membrane. The requirement for a pressure differential necessitates a source of compressed or pressurized air. Another type of gas separator is based on an electrochemical cell such as a proton exchange membrane (PEM) electrochemical cell, which produces NEA by electrochemically generating protons for combination with oxygen to remove it from air.

BRIEF DESCRIPTION

A system is disclosed for providing inert gas to a protected space. The system includes an electrochemical cell comprising a cathode and an anode separated by a separator comprising a proton transfer medium. Also in the system, a power source is arranged to provide a voltage differential between the anode and the cathode. A cathode fluid flow path is in operative fluid communication with the cathode between a cathode fluid flow path inlet and a cathode fluid flow path outlet. An anode fluid flow path is in operative fluid communication with the anode, between an anode fluid flow path inlet and an anode fluid flow path outlet. A cathode supply fluid flow path is between an air source and the cathode fluid flow path inlet, and an inerting gas flow path in operative fluid communication with the cathode fluid flow path outlet and the protected space. An anode supply fluid flow path is between a process water source and the anode fluid flow path inlet. A process water fluid flow path is in operative fluid communication with the anode fluid flow path inlet and the anode fluid flow path outlet, including a gas outlet that discharges gas from the process water fluid flow path. A gas discharge valve is in fluid communication with the gas outlet. The gas discharge valve is operative to allow fluid communication between the process water fluid flow path and a discharge side of the gas outlet in response to gas on the process water fluid flow path, and to block fluid communication between the process water fluid flow path and the discharge side of the gas outlet in response to a lack of gas on the process water fluid flow path.

Also disclosed is a method of inerting a protected space. According to the method, process water is delivered to an anode of an electrochemical cell comprising the anode and a cathode separated by a separator comprising a proton transfer medium. A portion of the process water is electrolyzed at the anode to form protons and oxygen, and the protons are transferred across the separator to the cathode. Process water is directed through a process water fluid flow path including a gas outlet and a gas discharge valve in operative fluid communication with the gas outlet. The gas discharge valve opens in response to the presence of gas in the process water fluid flow path to remove the gas through the gas outlet and form a de-gassed process water, and the de-gassed process water is recycled to the anode. Air is delivered to the cathode and oxygen is reduced at the cathode to generate oxygen-depleted air, and the oxygen-depleted air is directed from the cathode of the electrochemical cell along an inerting gas flow path to the protected space.

In any one or combination of the foregoing aspects, the gas outlet can be located at a high point of the process water fluid flow path.

In any one or combination of the foregoing aspects, the system can further include a liquid-gas separator on the process water fluid flow path, wherein the liquid-gas separator includes an inlet and a liquid outlet each in operative fluid communication with the process water fluid flow path, and wherein the liquid-gas separator further includes said gas outlet.

In any one or combination of the foregoing aspects, the gas discharge valve can include a poppet valve that is buoyant with respect to process water on the process water fluid flow path or that is connected by a linkage to a float that is buoyant with respect to process water on the process water fluid flow path.

In any one or combination of the foregoing aspects, the gas discharge valve can include a closure connected by a pivotal lever linkage to a float that is buoyant with respect to process water on the process water fluid flow path.

In any one or combination of the foregoing aspects, the gas discharge valve can include a valve body including a lower inlet in fluid communication with the process water fluid flow path and an upper outlet, buoyant float, a pivotal lever linkage connected to the buoyant float, and a poppet valve including a lower poppet valve inlet, an upper poppet valve outlet, and a fluid passage between lower poppet valve inlet and the upper poppet valve outlet, wherein the gas discharge valve includes a first closure at the lower poppet valve inlet arranged to sealingly close against a valve seat on the pivotal lever linkage and a second closure at an upper end of the poppet valve arranged to sealingly close against a valve seat at the valve body upper outlet.

In any one or combination of the foregoing aspects, the gas discharge valve can include a closure responsive to different levels of force resulting from water on the process water fluid flow path and from gas on the process water fluid flow path.

In any one or combination of the foregoing aspects, the gas discharge valve can include a closure connected to an actuator comprising a hygroscopic material that swells in response to contact with process water on the process water fluid flow path.

In any one or combination of the foregoing aspects, the system can further include a heater or a first heat exchanger including a heat absorption side in operative fluid communication with the process water fluid flow path.

In any one or combination of the foregoing aspects, the system can further include a second heat exchanger including a heat rejection side in operative fluid communication with the process water fluid flow path and a heat absorption side in operative thermal communication with a heat sink.

In any one or combination of the foregoing aspects, the gas outlet can receive process water discharged from the heater or first heat exchanger, and the heat rejection side inlet of the second heat exchanger receives process water from a process water fluid flow path side of the gas outlet.

In any one or combination of the foregoing aspects, the system can further include a second heat exchanger including a heat rejection side in operative fluid communication with the process water fluid flow path and a heat absorption side in operative thermal communication with a heat sink.

In any one or combination of the foregoing aspects, the system can include a plurality of said electrochemical cells in a stack separated by electrically-conductive fluid flow separators.

In any one or combination of the foregoing aspects, the system can further include a sensor configured to directly or indirectly measure dissolved oxygen content of process water that enters the gas-liquid separator, and a controller configured to provide a target response of the sensor through control of a pressure differential between the process water fluid flow path and the discharge side of the gas outlet.

BRIEF DESCRIPTION OF THE DRAWINGS

The following descriptions should not be considered limiting in any way. With reference to the accompanying drawings, like elements are numbered alike:

FIGS. 8A, 8B, and 8C are schematic illustrations of an example embodiment of a biased gas discharge valve;

FIGS. 9A and 9B are schematic illustrations of an example embodiment of a gas discharge valve including an actuator that expands in response to water;

DETAILED DESCRIPTION

A detailed description of one or more embodiments of the disclosed apparatus and method are presented herein by way of exemplification and not limitation with reference to the Figures.

Although shown and described above and below with respect to an aircraft, embodiments of the present disclosure are applicable to on-board systems for any type of vehicle or for on-site installation in fixed systems. For example, military vehicles, heavy machinery vehicles, sea craft, ships, submarines, etc., may benefit from implementation of embodiments of the present disclosure. For example, aircraft and other vehicles having fire suppression systems, emergency power systems, and other systems that may involve electrochemical systems as described herein may include the redundant systems described herein. As such, the present disclosure is not limited to application to aircraft, but rather aircraft are illustrated and described as example and explanatory embodiments for implementation of embodiments of the present disclosure.

Figure 1A:
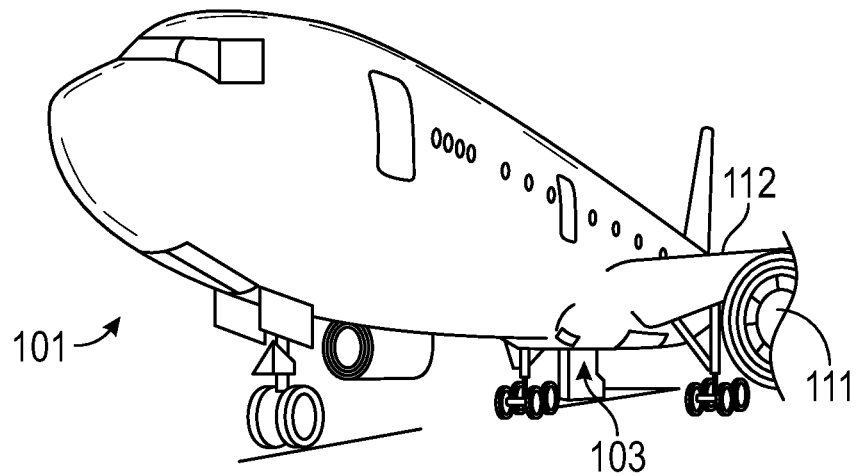
FIG. 1A is a schematic illustration of an aircraft that can incorporate various embodiments of the present disclosure.
Figure 1B:
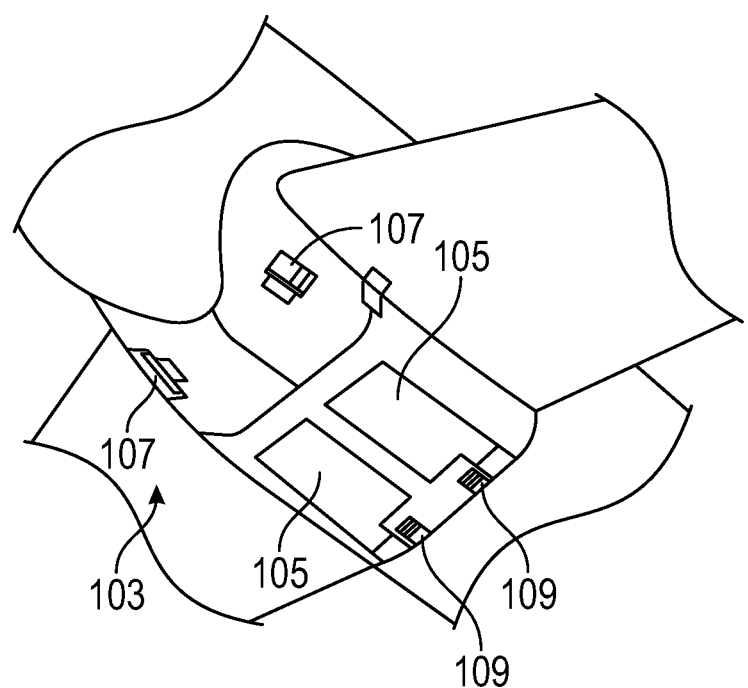
FIG. 1B is a schematic illustration of a bay section of the aircraft of FIG. 1A.

As shown in FIGS. 1A-1B, an aircraft includes an aircraft body 101, which can include one or more bays 103 beneath a center wing box. The bay 103 can contain and/or support one or more components of the aircraft 101. For example, in some configurations, the aircraft can include environmental control systems (ECS) and/or on-board inert gas generation systems (OBIGGS) within the bay 103. As shown in FIG. 1B, the bay 103 includes bay doors 105 that enable installation and access to one or more components (e.g., OBIGGS, ECS, etc.). During operation of environmental control systems and/or fuel inerting systems of the aircraft, air that is external to the aircraft can flow into one or more ram air inlets 107. The outside air may then be directed to various system components (e.g., environmental conditioning system (ECS) heat exchangers) within the aircraft. Some air may be exhausted through one or more ram air exhaust outlets 109.

Also shown in FIG. 1A, the aircraft includes one or more engines 111. The engines 111 are typically mounted on the wings 112 of the aircraft and are connected to fuel tanks (not shown) in the wings, but may be located at other locations depending on the specific aircraft configuration. In some aircraft configurations, air can be bled from the engines 111 and supplied to OBIGGS, ECS, and/or other systems, as will be appreciated by those of skill in the art.

Figure 2:
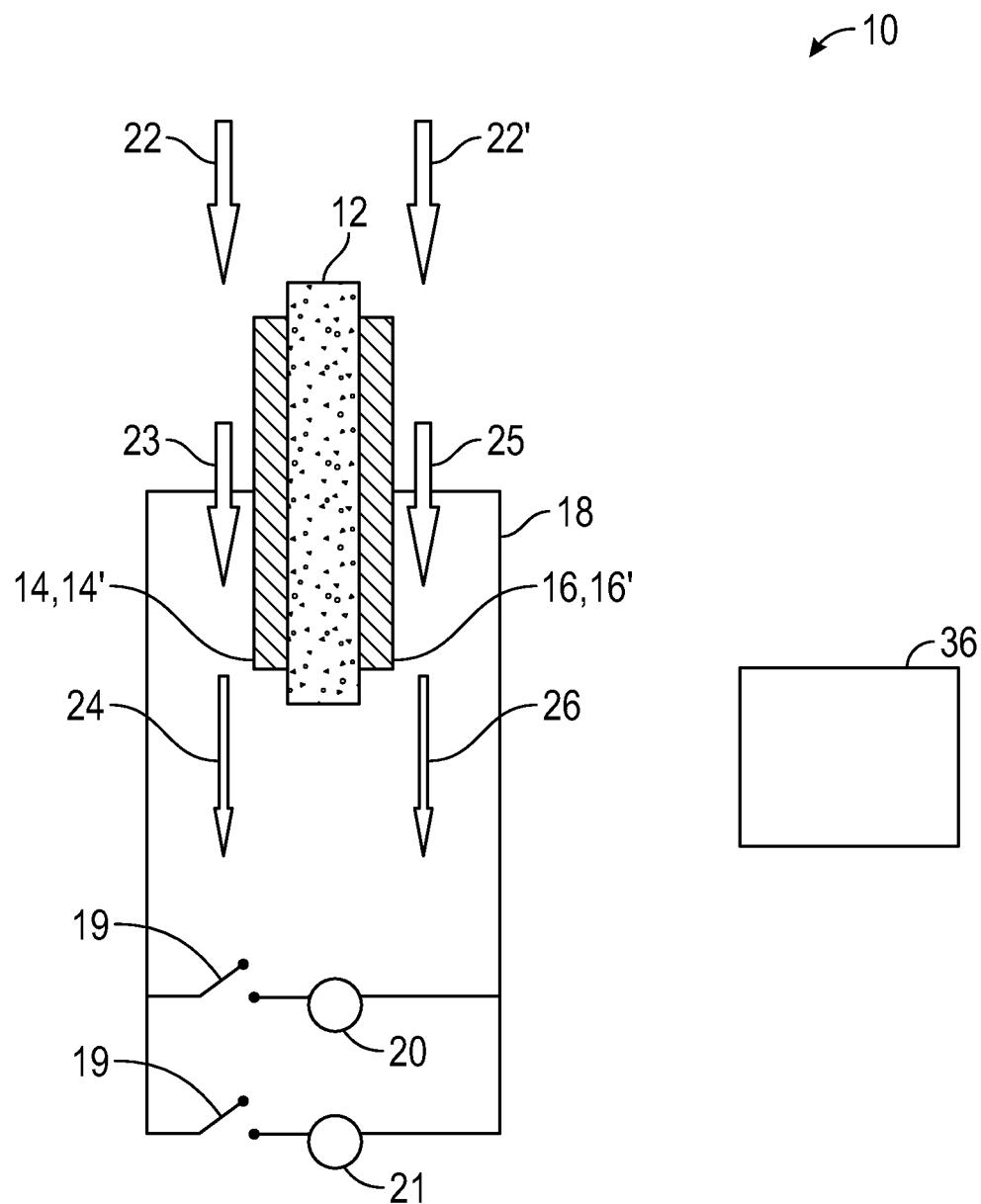
FIG. 2 is a schematic depiction an example embodiment of an electrochemical cell.

Referring now to FIG. 2, an electrochemical cell is schematically depicted. The electrochemical cell 10 comprises a separator 12 that includes an ion transfer medium.

As shown in FIG. 2, the separator 12 has a cathode 14 disposed on one side and an anode 16 disposed on the other side. Cathode 14 and anode 16 can be fabricated from catalytic materials suitable for performing the needed electrochemical reaction (e.g., the oxygen-reduction reaction at the cathode and an oxidation reaction at the anode). Exemplary catalytic materials include, but are not limited to, nickel, platinum, palladium, rhodium, carbon, gold, tantalum, titanium, tungsten, ruthenium, iridium, osmium, zirconium, alloys thereof, and the like, as well as combinations of the foregoing materials. Cathode 14 and anode 16, including catalyst 14' and catalyst 16', are positioned adjacent to, and preferably in contact with the separator 12 and can be porous metal layers deposited (e.g., by vapor deposition) onto the separator 12, or can have structures comprising discrete catalytic particles adsorbed onto a porous substrate that is attached to the separator 12. Alternatively, the catalyst particles can be deposited on high surface area powder materials (e.g., graphite or porous carbons or metal-oxide particles) and then these supported catalysts may be deposited directly onto the separator 12 or onto a porous substrate that is attached to the separator 12. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the separator 12. In either case, the cathode and anode layers 14 and 16 may also include a binder material, such as a polymer, especially one that also acts as an ionic conductor such as anion-conducting ionomers. In some embodiments, the cathode and anode layers 14 and 16 can be cast from an "ink," which is a suspension of supported (or unsupported) catalyst, binder (e.g., ionomer), and a solvent that can be in a solution (e.g., in water or a mixture of alcohol(s) and water) using printing processes such as screen printing or ink jet printing.

The cathode 14 and anode 16 can be controllably electrically connected by electrical circuit 18 to a controllable electric power system 20, which can include a power source (e.g., DC power rectified from AC power produced by a generator powered by a gas turbine engine used for propulsion or by an auxiliary power unit) and optionally a power sink 21. In some embodiments, the electric power system 20 can optionally include a connection to the electric power sink 21 (e.g., one or more electricity-consuming systems or components onboard the vehicle) with appropriate switching (e.g., switches 19), power conditioning, or power bus(es) for such on-board electricity-consuming systems or components, for optional operation in an alternative fuel cell mode.

With continued reference to FIG. 2, a cathode supply fluid flow path 22 directs gas from an air source (not shown) into contact with the cathode 14. Oxygen is electrochemically depleted from air along the cathode fluid flow path 23, and can be exhausted to the atmosphere or discharged as nitrogen-enriched air (NEA) (i.e., oxygen-depleted air, ODA) to an cathode fluid flow path outlet 24 leading to an inert gas flow for delivery to an on-board fuel tank (not shown), or to a vehicle fire suppression system associated with an enclosed space (not shown), or controllably to either or both of a vehicle fuel tank or an on-board fire suppression system. An anode fluid flow path 25 is configured to controllably receive an anode supply fluid from an anode supply fluid flow path 22'. The anode fluid flow path 25 includes water when the electrochemical cell is operated in an electrolytic mode to produce protons at the anode for proton transfer across the separator 12 (e.g., a proton transfer medium such as a proton exchange membrane (PEM) electrolyte or phosphoric acid electrolyte). If the system is configured for alternative operation in a fuel cell mode, the anode fluid flow path 25 can be configured to controllably also receive fuel (e.g., hydrogen). The protons formed at the anode are transported across the separator 12 to the cathode 14, leaving oxygen on the anode fluid flow path, which is exhausted through an anode fluid flow path outlet 26. The oxygen effluent may be entrained in process water in the form of bubbles or dissolved in the process water. Control of fluid flow along these flow paths can be provided through conduits and valves (not shown), which can be controlled by a controller 36 including a programmable or programmed microprocessor.

Exemplary materials from which the electrochemical proton transfer medium can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION™ resins (commercially available from E. I. du Pont de Nemours and Company, Wilmington, Del.). Alternatively, instead of an ion-exchange membrane, the separator 12 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazole). These types of alternative "membrane electrolytes" are well known and have been used in other electrochemical cells, such as phosphoric-acid electrolyzers and fuel cells.

During operation of a proton transfer electrochemical cell in the electrolytic mode, water at the anode undergoes an electrolysis reaction according to the formula:

$$H_2O \rightarrow \tfrac{1}{2}O_2 + 2H^+ + 2e^- \tag{1a}$$

$$3H_2O \rightarrow O_3 + 6H^+ + 6e^- \tag{1b}$$

By varying the voltage, the desired reaction 1a or 1b may be favored. For example, elevated cell voltage is known to promote ozone formation (reaction 1b). Since ozone is a form of oxygen, the term oxygen as used herein refers individually to either or collectively to both of diatomic oxygen and ozone.

The electrons produced by this reaction are drawn from electrical circuit 18 powered by electric power source 20 connecting the positively charged anode 16 with the cathode 14. The hydrogen ions (i.e., protons) produced by this reaction migrate across the separator 12, where they react at the cathode 14 with oxygen in the cathode flow path 23 to produce water according to the formula:

$$\tfrac{1}{2}O_2 + 2H^+ + 2e^- \rightarrow H_2O \tag{2}$$

Removal of oxygen from cathode flow path 23 produces nitrogen-enriched air exiting the region of the cathode 14. The oxygen and ozone evolved at the anode 16 by the reaction of formula (1) is discharged as anode fluid flow path outlet 26.

During operation of a proton transfer electrochemical cell in a fuel cell mode, fuel (e.g., hydrogen) at the anode undergoes an electrochemical oxidation according to the formula:

$$H_2 \rightarrow 2H^+ + 2e^- \tag{3}$$

The electrons produced by this reaction flow through electrical circuit 18 to provide electric power to the electric power sink 21. The hydrogen ions (i.e., protons) produced by this reaction migrate across the separator 12, where they react at the cathode 14 with oxygen in the cathode flow path 23 to produce water according to the formula (2): ($\frac{1}{2}O_2$+ $2H^+ + 2e^- \rightarrow H_2O$), in which removal of oxygen from cathode flow path 23 produces nitrogen-enriched air exiting the region of the cathode 14.

As mentioned above, the electrolysis reaction occurring at the positively charged anode 16 requires water, and the ionic polymers used for a PEM electrolyte perform more effectively in the presence of water. Accordingly, in some embodiments, a PEM membrane electrolyte is saturated with water or water vapor. Although the reactions (1) and (2) are stoichiometrically balanced with respect to water so that there is no net consumption of water, in practice some amount of moisture will be removed through the cathode fluid flow path outlet 24 and/or the anode fluid flow path outlet 26 (either entrained or evaporated into the exiting gas streams). Accordingly, in some exemplary embodiments, water from a water source is circulated past the anode 16 along an anode fluid flow path (and optionally also past the cathode 14). Such water circulation can also provide cooling for the electrochemical cells. In some exemplary embodiments, water can be provided at the anode from humidity in air along an anode fluid flow path in fluid communication with the anode. In other embodiments, the water produced at cathode 14 can be captured and recycled to anode 16 (e.g., through a water circulation loop, not shown). It should also be noted that, although the embodiments are contemplated where a single electrochemical cell is employed, in practice multiple electrochemical cells will be electrically connected in series with fluid flow to the multiple cathode and anode flow paths routed through manifold assemblies.

Figure 3:
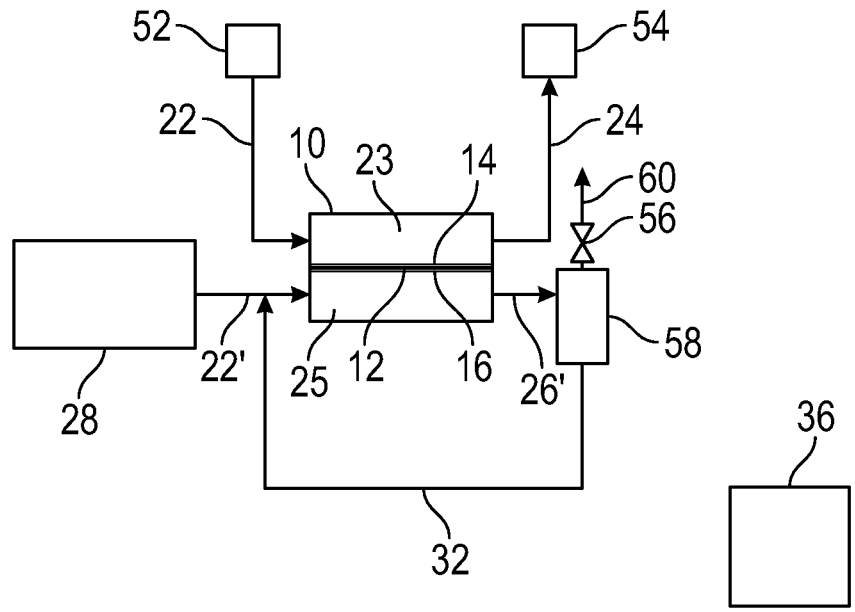
FIG. 3 is a schematic illustration of an example embodiment of an electrochemical inert gas generating system with a liquid-gas separator vessel including a gas outlet with a gas discharge valve.
Figure 4:
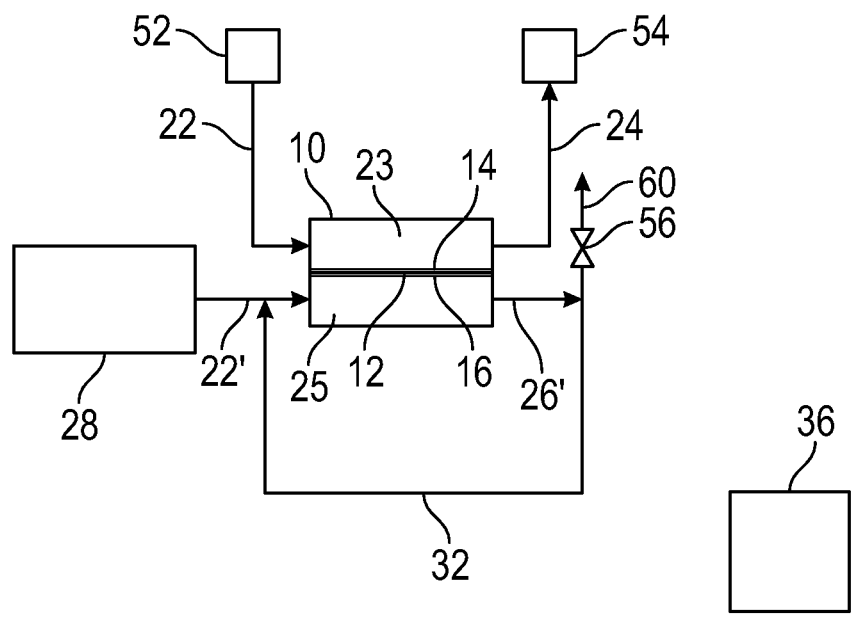
FIG. 4 is a schematic illustration of an example embodiment of an electrochemical inert gas generating system with a gas outlet with a gas discharge valve.
Figure 10:
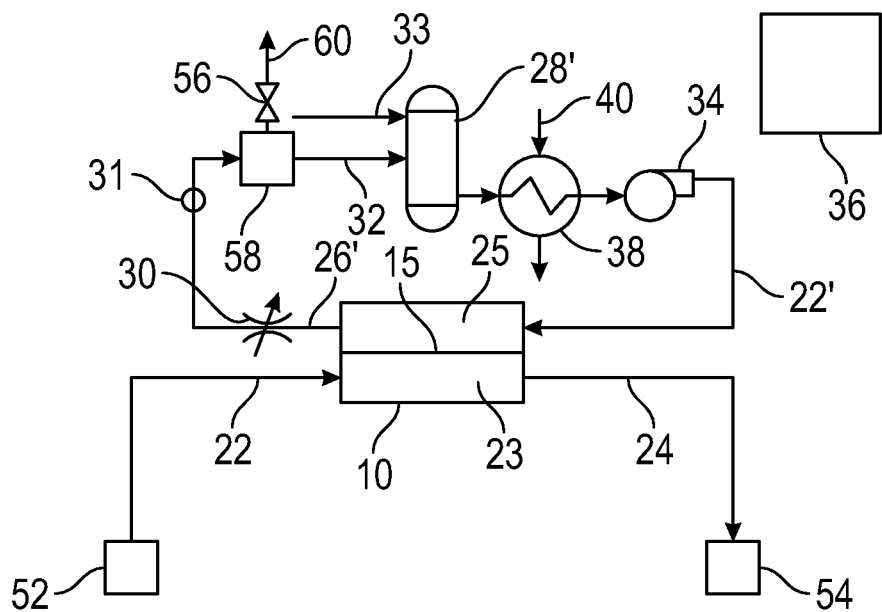
FIG. 10 is a schematic illustration of another example embodiment of another electrochemical inert gas generating system.
Figure 11:
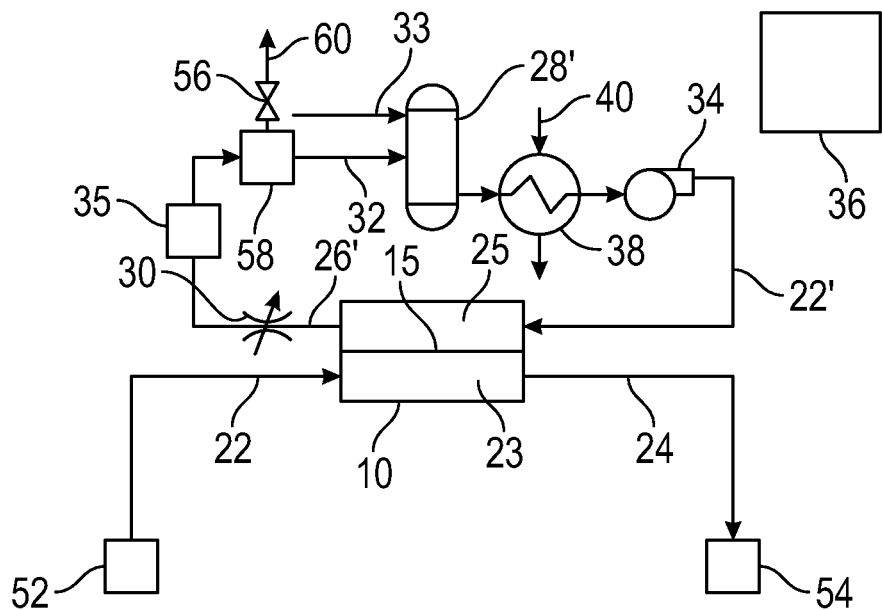
FIG. 11 is a schematic illustration of an example embodiment of yet another electrochemical inert gas generating system.

In some aspects, the gas outlet 60 can be disposed on a gas-liquid separator vessel such as a vessel 58 as shown in FIG. 3. The gas-liquid separator 58 can include a tank with a liquid space and a vapor space inside, allowing for gas to separate and accumulate in the vapor space for discharge through the gas outlet 60, and for liquid to be removed from the liquid space and transported back to the electrochemical cell 10. In some aspects, a vessel for gas-liquid separation vessel is not necessary, and the gas outlet 60 can be disposed on a fluid flow conduit at a high point on the flow path 26' where gas accumulates as shown in the example embodiment of FIG. 4. It is noted here that FIGS. 4 and 10-11 show different variations of fuel tank inerting systems, and use some of the same reference numbers as FIG. 3. Such same numbers are used to describe the same components in FIGS. 4 and 10-11 as in FIG. 3, without the need for (or inclusion of) repeated descriptions of the components. For a description of the components identified by such same numbers, reference can be made to the description of FIG. 3 or other such previous Figure where the reference numbers were first introduced.

Removal of gas through the gas outlet 60 is promoted by gas discharge valve 56. The gas discharge 56 is in fluid communication with the gas outlet. The gas discharge valve 56 is operative to allow fluid communication between the process water fluid flow path and a discharge side of the gas outlet in response to gas on the process water fluid flow path 26', and to block fluid communication between the process water fluid flow path and the discharge side of the gas outlet in response to a lack of gas on the process water fluid flow path 26'.

Various types of valves can be used as the gas discharge valve 56 as shown in FIGS. 5A-5B, 6A-6B, 7A-7C, 8A-8C, and 9A-9B. In each of these Figures, the lower end of the gas discharge valve is in operative fluid communication with the process water fluid flow path 26' and the upper end is in operative fluid communication with a discharge space.

Figure 5A:
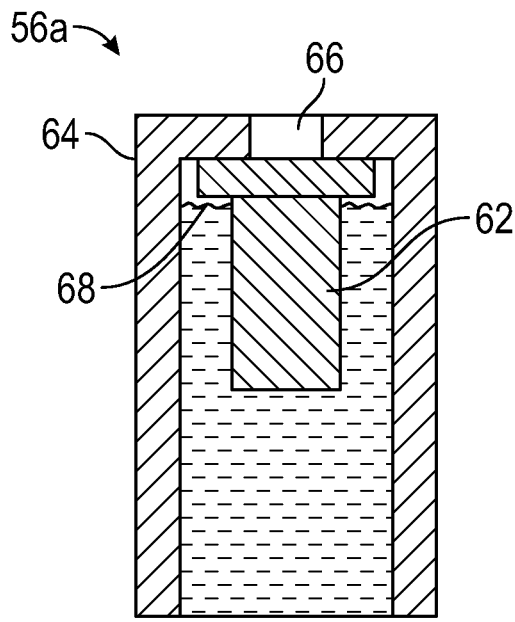
FIGS. 5A and 5B are schematic illustrations of an example embodiment of a gas discharge valve including a poppet valve.
Figure 5B:
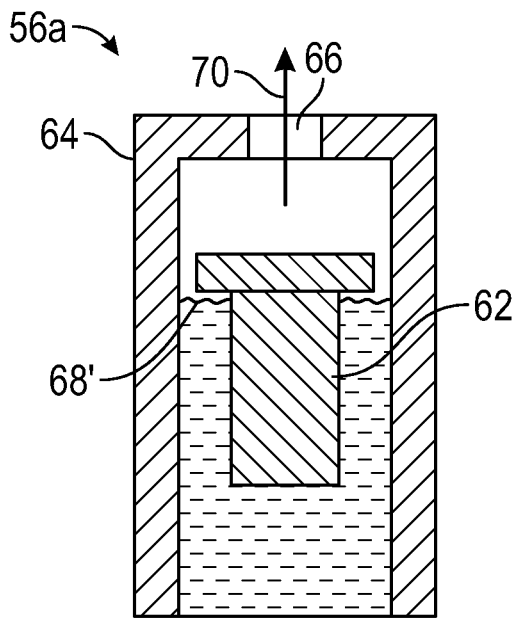

In some aspects, the gas discharge valve 56 can include a poppet valve that is buoyant with respect to process water on the process water fluid flow path or that is connected by a linkage to a float that is buoyant with respect to process water on the process water fluid flow path. FIGS. 5A and 5B show schematic illustrations of a gas discharge valve 56a including a buoyant poppet valve. As shown in FIGS. 5A and 5B, a poppet float 62 is disposed inside a valve body 64 that includes a discharge opening 66. In FIGS. 5A and 5B, the poppet float 62 is shown as buoyant, but the in the case of a non-buoyant poppet valve the bottom of the poppet float 62 can be connected via a vertical linkage (not shown) to a separate buoyant float (not shown). As shown in FIG. 5A, a relatively high water level 68 floats the poppet float 62 into a position in which it seats against discharge opening 66 so that the valve is closed. In FIG. 5B, gas accumulating in the upper portion of the interior of the valve body 64 causes the water level to drop to a lower water level 68', which in turn causes poppet float 62 to drop along with the reduced water level 68' so that the gas is discharged through the discharge opening 66 as represented by gas discharge arrow 70. As gas is discharged through the discharge opening 66, the water level can rise again and cause the gas discharge valve 56a to close.

Figure 6A:
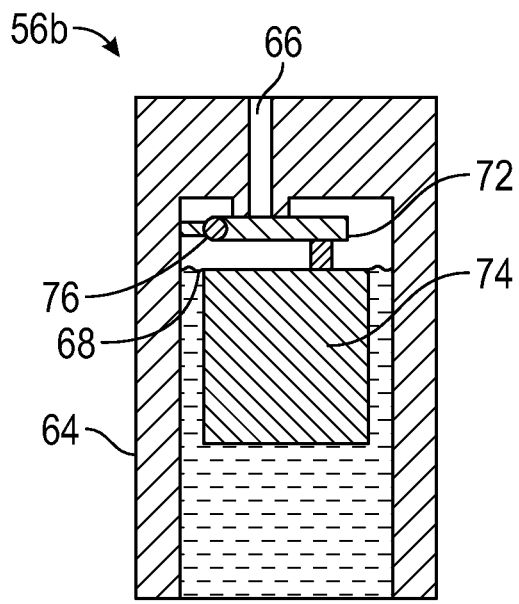
FIGS. 6A and 6B are schematic illustrations of an example embodiment of a gas discharge valve including a pivoted lever linkage.
Figure 6B:
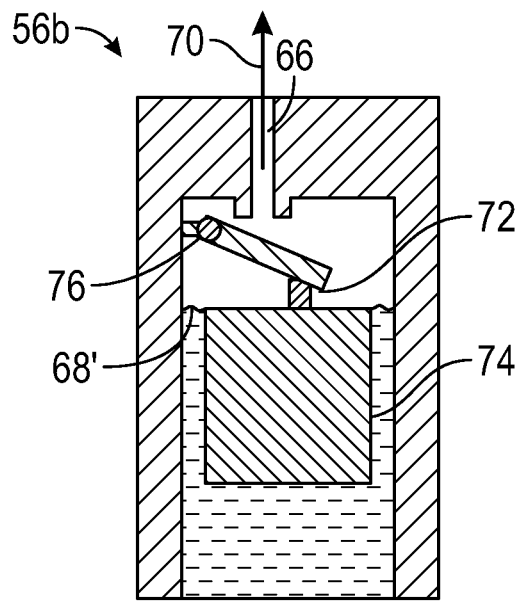

In some aspects, the gas discharge valve 56 can include a closure connected by a pivotal lever linkage to a float that is buoyant with respect to process water on the process water fluid flow path. FIGS. 6A and 6B show schematic illustrations of a gas discharge valve 56b including pivoted lever 72 linked to a buoyant float 74 in a valve body 64 with a discharge opening 66. As shown in FIG. 6A, a relatively high water level 68 floats the buoyant float 74 into a position in which urges the pivoted lever 72 into a position in which it seats against discharge opening 66 so that the valve is closed. In FIG. 6B, gas accumulating in the upper portion of the interior of the valve body 64 causes the water level to drop to a lower water level 68', which in turn causes buoyant float 74 to drop along with the reduced water level 68'. As the buoyant float 74 drops, the pivoted lever 72 pivots around pivot mount 76 so that the pivoted lever 72 disengages from the discharge opening 66, allowing the gas to be discharged through the discharge opening 66 as represented by gas discharge arrow 70. As gas is discharged through the discharge opening 66, the water level can rise again and cause the gas discharge valve 56b to close.

Figure 7A:
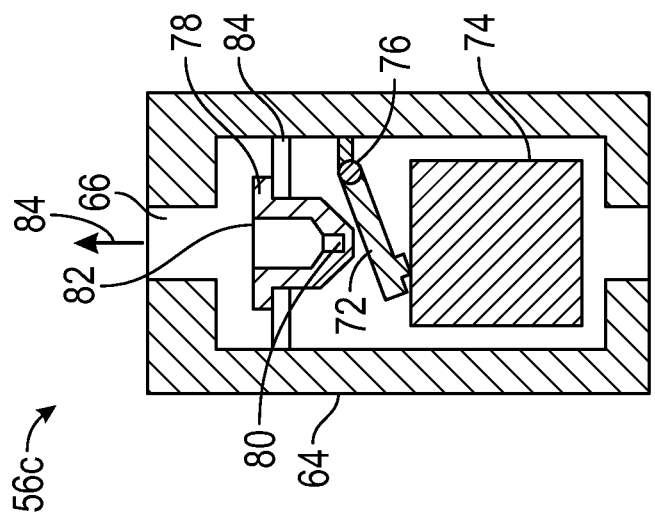
FIGS. 7A, 7B, and 7C are schematic illustrations of an example embodiment of a gas discharge valve including a poppet valve and a pivoted lever linkage.
Figure 7B:
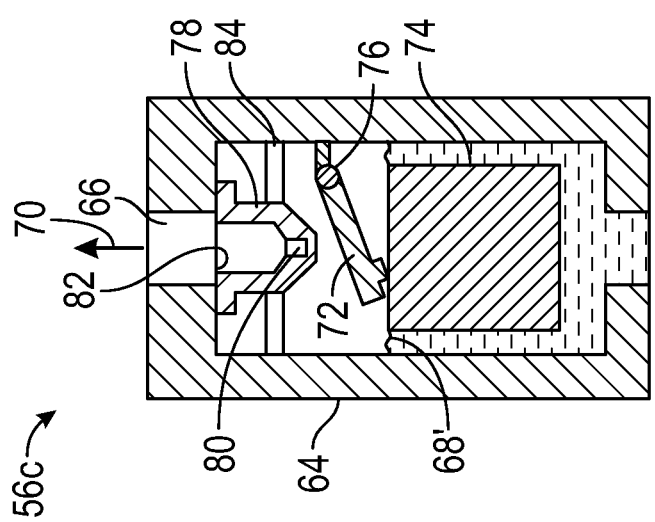
Figure 7C:
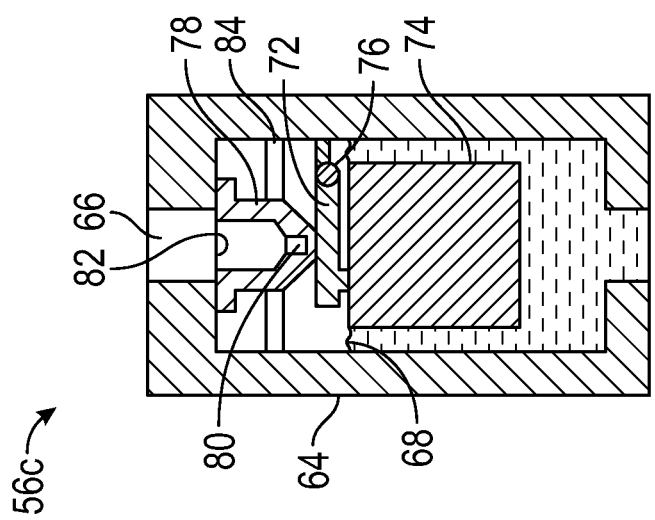

In some aspects, the gas discharge valve can include both pivoted lever closure and a poppet valve closure. As shown in FIGS. 7A, 7B, and 7C, a gas discharge valve 56c includes a buoyant float 74 disposed within a valve body 64 having a discharge opening 66, along with a pivoted lever linkage 72 is disposed between a buoyant float 74 and a poppet valve 78 that includes a lower poppet valve inlet 80 and an upper poppet valve outlet 82 connected by a fluid passage. As shown in FIG. 7A, a relatively high water level 68 floats the buoyant float 74 into a position in which urges the pivoted lever 72 into a position in which it seats against the poppet valve inlet 80, and the poppet valve 78 is also seated against the discharge opening 66 so that the valve is closed. In FIG. 7B, gas accumulating in the upper portion of the interior of the valve body 64 causes the water level to drop to a lower water level 68', which in turn causes buoyant float 74 to drop along with the reduced water level 68'. As the buoyant float 74 drops, the pivoted lever 72 pivots around pivot mount 76 so that the pivoted lever 72 disengages from the poppet valve inlet 80, allowing the gas to enter the poppet valve inlet 80, from which it flows through the poppet valve fluid passage and out of the poppet valve outlet 82 from which it discharged through the discharge opening 66 as represented by gas discharge arrow 70. As gas is discharged through the discharge opening 66, the water level can rise again and cause the valve to close. In the configuration shown in FIG. 7B, a pressure differential between the interior of the valve body 64 and the exterior keeps the poppet valve 80 sealed against the discharge opening 66. However, in cases of a reduction in pressure on the process water fluid flow path 26' such as from a leak that could draw a vacuum and potentially damage system components, the reverse pressure differential represented by gas flow arrow 84 will cause the poppet valve 82 to disengage from discharge opening 66, providing a larger opening for gas flow as shown in FIG. 7C. In this configuration, the poppet valve 82 is supported by a poppet valve support 84 that includes openings for gas flow, so the poppet valve inlet 80 can remain engaged with or can be disengaged from the pivoted lever 72.

In some aspects, the gas discharge valve 56 can include a closure responsive to different levels of force resulting from water on the process water fluid flow path and from gas on the process water fluid flow path. FIGS. 8A, 8B, and 8C show schematic illustrations of a gas discharge valve 56d including a valve member 86 biased in a downward direction by a bias member 88 such as a spring in a valve body 64 with a discharge opening 66 and an intake opening 67 in operative fluid communication with the process water fluid flow path 26'. As shown in FIG. 8A, a relatively high force is exerted against the valve member 86 by water flowing on the process water fluid flow path 26'. The force is sufficient to overcome the bias from bias member 88, causing the valve member 86 to seat against discharge opening 66 so that the valve is closed. In FIG. 8B, reduced a presence of air on the process water fluid flow path 26' reduces the mass of the fluid and thus the momentum and force applied against the valve member 86, which allows the bias member 88 to urge the valve member 86 to disengage from the discharge opening 66, allowing the gas to be discharged through the discharge opening 66 as represented by gas discharge arrow 70. As gas is discharged through the discharge opening 66, valve configuration can revert to the configuration shown in FIG. 8A with the valve closed. FIG. 8C shows a valve configuration in a system shut-down mode, in which a lack of force from process water flowing on the process water fluid flow path 26' allows the bias member 88 to urge the valve member 86 into engagement with the intake opening 67 so that the gas discharge valve 56d is closed.

In some aspects, the gas discharge valve 56 can include a closure connected to an actuator comprising a hygroscopic material that swells in response to contact with process water on the process water fluid flow path 26'. As shown in FIGS. 9A and 9B, a gas discharge valve 56e includes a valve member 90 disposed inside a valve body 64 that includes a discharge opening 66. The valve member 90 is engaged with an actuator 92 that includes a hygroscopic material 94. Examples of hygroscopic materials include but are not limited to neoprene, cellulose, polyacrylamide gel, polyether block amide copolymer, bentonite, and hydrogels based on hydrophilic polymers such as poly(N-isopropylacrylamide), poly-(2-hydroxyethyl methacrylate), and poly(acrylic acid)-poly(allylamine hydrochloride) that expand in response to contact with water. As shown in FIG. 8A, a relatively high water level 68 keeps the hygroscopic material in an expanded state in which it urges the actuator into a position to in which the valve member 90 is seated against discharge opening 66 so that the valve is closed. In FIG. 8B, gas accumulating in the upper portion of the interior of the valve body 64 causes the water level to drop to a lower water level 68' below that of the actuator 92 including hygroscopic material 94, which in turn causes the hygroscopic material 94 to contract so that the valve member 90 disengages from the discharge opening so that the gas is discharged through the discharge opening 66 as represented by gas discharge arrow 70. As gas is discharged through the discharge opening 66, the water level can rise again and cause the gas discharge valve 56e to close.

With continuing reference to FIGS. 3-4, and also FIGS. 10-11 discussed below, oxygen from the gas outlet 60 can be exhausted to atmosphere or can be used for other applications such as an oxygen stream directed to aircraft occupant areas, occupant breathing devices, an oxygen storage tank, or an emergency aircraft oxygen breathing system. Ozone from the gas outlet 60 can be exhausted to atmosphere or can be used for other onboard applications such as for water purification or as a biocide for biofilms such as can form in tanks such as fuel tanks and water tanks. Additional components promoting the separation of gas from liquid on the flow path 26' such as coalescing filters, vortex gas-liquid separators, membrane separators, heaters, heat exchangers, etc. can also be utilized, as described in further detail below as described in further detail below or in U.S. patent application Ser. No. 16/375,659, the disclosure of which is incorporated herein by reference in its entirety. Other components and functions can also be incorporated with the flow path 26', including but not limited to water purifiers such as disclosed U.S. patent application Ser. No. 16/374,913, the disclosure of which is incorporated herein by reference in its entirety.

The electrochemical cell or cell stack 10 generates an inert gas on the cathode fluid flow path 23 by depleting oxygen to produce oxygen-depleted air (ODA), also known as nitrogen-enriched air (NEA) at the cathode 14 that can be directed to a protected space 54 (e.g., a fuel tank ullage space, a cargo hold, or an equipment bay). An air source 52 (e.g., ram air, compressor bleed, blower) is directed to the cathode fluid flow path 23 where oxygen is depleted by electrochemical reactions with protons that have crossed the separator 12 as well as electrons from an external circuit (not shown) to form water at the cathode 14. The ODA thereby produced can be directed to a protected space 54 such as an ullage space in in the aircraft fuel tanks as disclosed or other protected space 54. The inert gas flow path (cathode fluid flow path outlet 24) can include additional components (not shown) such as flow control valve(s), a pressure regulator or other pressure control device, and water removal device(s) such as a heat exchanger condenser, a membrane drier or other water removal device(s), or a filter or other particulate or contaminant removal devices. Additional information regarding the electrochemical production of ODA can be found in U.S. Pat. Nos. 9,963,792, 10,312,536, and U.S. patent application Ser. No. 16/029,024, the disclosures of each of which are incorporated herein by reference in their entirety.

In some embodiments, the electrochemical cell can be used in an alternate mode to provide electric power for on-board power-consuming systems, as disclosed in the above-referenced U.S. Pat. No. 10,312,536. In this mode, fuel (e.g., hydrogen) is directed from a fuel source to the anode 16 where hydrogen molecules are split to form protons that are transported across the separator 12 to combine with oxygen at the cathode. Simultaneously, reduction and oxidation reactions exchange electrons at the electrodes, thereby producing electricity in an external circuit. Embodiments in which these alternate modes of operation can be utilized include, for example, operating the system in alternate modes selected from a plurality of modes including a first mode of water electrolysis (either continuously or at intervals) under normal aircraft operating conditions (e.g., in which an engine-mounted generator provides electrical power) and a second mode of electrochemical electricity production (e.g., in response to a demand for emergency electrical power such as due to failure of an engine-mounted generator). ODA can be produced at the cathode 14 in each of these alternate modes of operation.

In some aspects, the gas inerting system can promote gas(es) dissolved in the process water (e.g., oxygen) to evolve gas in the gas phase that can be removed from the process water fluid flow path 26' through the gas outlet 60. The solubility of gases such as oxygen in water varies inversely with temperature and varies directly with pressure. Accordingly, higher temperatures can provide lower solubility of oxygen (or ozone) in water, and lower temperatures provide greater solubility of oxygen (or ozone) in water. Similarly, reduced pressures provide lower solubility of oxygen in water. In some embodiments, the systems described herein can be configured to promote evolution of gas(es) from dissolved gas(es) in the process water through thermal control and/or pressure control for removal from the process water fluid flow path. Thermal and pressure management can be provided as discussed in more detail further below.

With reference now to FIGS. 10-11, example embodiments are shown of a gas inerting system utilizing an electrochemical cell or stack 10 and thermal and/or pressure management. As shown in FIG. 10, the cathode side of the electrochemical cell or stack 10 produces ODA on the cathode fluid flow path 23 as inert gas for a protected space in the same manner as discussed above with respect to FIGS. 3 and 4. Also, for ease of illustration, the separator 12, cathode 14, and anode 16 are shown as a single membrane electrode assembly (MEA) 15. It is noted that FIGS. 10-11 show counter-flow between the anode and cathode sides of the MEA 15, whereas FIGS. 3-4 show co-flow; however, many configurations can utilize cross-flow configurations that are not shown in the Figures herein for ease of illustration. It is further noted that, although not shown in FIGS. 10-11, process water for thermal management can also be in fluid and thermal communication with the cathode side of the electrochemical cell 10 as will be understood by the skilled person. On the anode side of the electrochemical cell 10, process water from the water source (e.g. a water reservoir 28' equipped with a process make-up water feed line 33) is directed along the anode supply fluid flow path 22' by a pump 34. The pump 34 provides a motive force to move the process water along the anode fluid flow path 25, from which it is directed through flow control valve 30 to a gas-liquid separator 58. Oxygen or other gases on the process water fluid flow path can be removed through a gas outlet 60 from the vessel 58 to gas discharge space 56, or the water reservoir 28' can itself serve as a gas-liquid separator by providing a sufficiently large volume for reduced flow velocity and a vapor space for gas-liquid separation and a gas outlet (not shown) to the gas discharge space 56.

As mentioned above, in some embodiments the controller 36 can control system operating parameters to provide a target dissolved gas content (e.g., a dissolved oxygen content) in the process water during operation. Dissolved oxygen concentration in the process water can be measured directly. Examples of oxygen sensors include (i.e., an oxygen sensor calibrated to determine dissolved oxygen content), but are not limited to sensors that utilize the measurement of variables such as impedance, spectral transmittance/absorbance of light, chemical reactivity of analytes with dissolved oxygen, electrochemical sensors (including the anode and cathode of the electrochemical cell/stack 10 and spot measurements thereon), chemical interactions, or combinations (e.g., chemiluminescent sensors). Dissolved oxygen levels can also be determined without a sensor calibrated directly for dissolved oxygen. For example, this can be accomplished by measuring one or more of other process parameters including but not limited to process water temperature, electrode temperatures, electrode voltages, electrode current densities, water pressure, vapor pressure (e.g., in a vapor phase in the vessel 58), cumulative readings and values determined over time for any of the above or other measured system parameters, elapsed time of operation, and comparing such parameters against empirical oxygen content data (e.g., a look-up table) to determine an inferred dissolved oxygen concentration. A sensor 31 is shown in FIGS. 10-11 disposed in the flow path 26', and can represent one or more sensors at the location shown or elsewhere in the system to measure any one or more of the above-mentioned or other parameters. For the sake of discussion below, the sensor 31 may be referred to as measuring for a concentration of dissolved oxygen in the process water, process water temperature, gas temperature, and pressure including gas pressure or liquid pressure. The sensors represented by sensor 31 can be located as shown in FIGS. 10-11 at or immediately upstream of the vessel 58. Other sensor locations can be utilized. For example, a dissolved oxygen sensor and/or temperature sensor could be disposed in the liquid space in reservoir 28'. Process water temperature and pressure can be measured at any of a number of potential locations such as at the anode flow path outlet, or upstream and/or downstream of the pump 34, or upstream and/or downstream of the flow control valve 30, or anywhere along either or both of the cathode fluid flow path 23 or the anode fluid flow path 25.

As mentioned above, the solubility of oxygen in water varies inversely with temperature, and in some embodiments the system can be controlled to add heat to the process water to promote dissolution and evolution of gas phase oxygen so that it can be separated and removed. In some embodiments, the process water can be contacted with a heat source upstream of a liquid-gas separator. A separate heat source can be used, such as a heater or a heat exchanger with a heat rejection side in fluid and/or thermal communication with a heat source. The heat source can also be the electrochemical cell/stack 10 itself. The enthalpy of the chemical reactions resulting from electrolytic generation of inert gas occurring on each side of the separator 12 are balanced, with water molecules being split on the anode side and atoms combined to form water on the cathode side. Accordingly, the electrical energy entered into the system results in generation of heat. Disposition of the gas outlet 60 in the flow path 26' downstream of the cell/stack 10 allows for heat generated by the cell/stack 10 to promote evolution of oxygen for separation and removal from the process water. Continual addition of heat into the system to promote oxygen removal could cause heat to accumulate in the system, and thermal management of the system can be accomplished with various protocols. For example, in some embodiments, heat can be dissipated into a volume of water such as the reservoir 28' without increasing process water temperatures outside of normal parameters during a projected duration of system operation.

However, in situations where the reservoir 28' cannot absorb process heat within tolerances, a heat exchanger can be included in the system as shown in FIG. 7 with heat exchanger 38. The heat exchanger 38 can provide cooling from a heat sink along the heat transfer flow path 40 (e.g., RAM air, a refrigerant from a cooling system such as a vapor compression cooling system). Multiple heat exchangers can also be used.

In some embodiments, the electrochemical cell stack 10' can be controlled to operate at parameters that provide a temperature at or upstream of a liquid-gas separator that is sufficient to produce a target dissolved oxygen level (as used herein, the terms upstream and downstream are defined as a position in a single iteration of the flow loop that begins and ends with the electrochemical cell stack 10'). In some embodiments, however, it may be desirable to operate the electrochemical cell stack at temperatures below that at which sufficient levels of dissolved oxygen are desolubilized. In such cases, a separate heater or heat exchanger can be included in the system, such as heater/exchanger 35 as shown in FIG. 11. The configuration of FIG. 11 can provide added heat from heater/exchanger 35 upstream of the vessel 58, and the added heat can be dissipated into a heat sink such as reservoir 28' or can be removed with a heat exchanger such as heat exchanger 38. Alternatively, or in addition to the use of a heater/exchanger 35 to add heat to the system, in some embodiments the electrochemical cell stack can be operated temporarily at a higher temperature during an oxygen-removal cycle, and then returned to operate at a lower temperature after completion of the oxygen-removal cycle.

Pressure management can also be utilized for promotion of evolution of gaseous oxygen from dissolved oxygen. For example, the placement of the control valve 30 upstream of the liquid-gas-separator can provide a reduction in pressure that can promote evolving of oxygen for removal from the process water. Output pressure of the pump 34 can also modify pressure to promote oxygen evolution.

In some embodiments, the process water can be heated using the pump and a pressure regulator. The pump performs mechanical work on the process water to actively heat it. In this way, the pump and pressure regulator serve as a heating element. Those skilled in the art will readily appreciate that in accordance with the First Law of Thermodynamics, the work performed on the process water elevates the internal energy of said fluid. In addition, in some embodiments the process water may also remove waste heat from the pump (e.g. bearings, motor drive, etc.). Those skilled in the art will readily appreciate that the work imparted to a fluid results from the change in the pressure and the change in volume of the fluid.

A flow rate of the process water through the electrochemical cell can be regulated by controlling the speed of the pump 34 or with a pressure regulator (not shown) along the process water flow path (e.g., 26'). Control of process water temperature based on output from a temperature sensor (not shown) along the anode fluid flow path 25 (and/or a temperature sensor along the cathode fluid flow path 23) can be accomplished, for example, by controlling the flow of process water through the heat exchanger 38 (e.g., by controlling the speed of the pump 34 or by diverting a controllable portion of the output flow of the pump 34 through a bypass around the heat exchanger 38 with control valves (not shown)) or by controlling the flow of a heat transfer fluid through the heat exchanger 38 along the flow path represented by 40.

It should be noted that system configurations shown in FIGS. 10-11 represent example embodiments, and that changes and modifications are contemplated. For example, in some embodiments a heat source (including the electrochemical cell or stack ("stack"), or a separate heat source) can be disposed upstream of a gas outlet with a gas discharge valve 56 ("outlet"), which can be disposed upstream of a heat-absorbing heat exchanger ("HX") in thermal communication with a heat sink. Such embodiments can provide a technical benefit of adding heat to promote evolution of gas from gas dissolved in the process water, and subsequent removal of such added heat from the process water. Examples of configurations of components include but are not limited to stack→heat source→outlet→HX, heat source→stack→outlet→HX, stack→outlet→HX. A pressure regulator can also be included to provide a lower pressure at the separator to promote evolution of gas, for example with an order of components of pump→stack/heat source→pressure regulator→outlet→HX.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an", "the", or "any" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for providing inerting gas to a protected space, comprising:
   an electrochemical cell comprising a cathode and an anode separated by a separator comprising a proton transfer medium;
   a power source arranged to provide a voltage differential between the anode and the cathode;
   a cathode fluid flow path in operative fluid communication with the cathode between a cathode fluid flow path inlet and a cathode fluid flow path outlet;
   an anode fluid flow path in operative fluid communication with the anode, between an anode fluid flow path inlet and an anode fluid flow path outlet;
   a cathode supply fluid flow path between an air source and the cathode fluid flow path inlet, and an inerting gas flow path in operative fluid communication with the cathode fluid flow path outlet and the protected space;

an anode supply fluid flow path between a process water source and the anode fluid flow path inlet;

a process water fluid flow path in operative fluid communication with the anode fluid flow path inlet and the anode fluid flow path outlet, including a gas outlet that discharges gas from the process water fluid flow path;

a gas discharge valve in fluid communication with the gas outlet, said gas discharge valve operative to allow fluid communication between the process water fluid flow path and a discharge side of the gas outlet in response to gas on the process water fluid flow path, and to block fluid communication between the process water fluid flow path and the discharge side of the gas outlet in response to a lack of gas on the process water fluid flow path; and a sensor configured to directly or indirectly measure dissolved oxygen content of process water that enters the gas-liquid separator;

a controller configured to provide a target response of the sensor through control of a pressure differential between the process water fluid flow path and the discharge side of the gas outlet.

2. The system of claim 1, wherein the gas outlet is located at a high point of the process water fluid flow path.

3. The system of claim 1, further comprising a liquid-gas separator on the process water fluid flow path, wherein the liquid-gas separator includes an inlet and a liquid outlet each in operative fluid communication with the process water fluid flow path, and wherein the liquid-gas separator further includes said gas outlet.

4. The system of claim 1, wherein the gas discharge valve includes a poppet valve that is buoyant with respect to process water on the process water fluid flow path or that is connected by a linkage to a float that is buoyant with respect to process water on the process water fluid flow path.

5. The system of claim 1, wherein the gas discharge valve includes a closure connected by a pivotal lever linkage to a float that is buoyant with respect to process water on the process water fluid flow path.

6. The system of claim 1, wherein the gas discharge valve includes a valve body including a lower inlet in fluid communication with the process water fluid flow path and an upper outlet, buoyant float, a pivotal lever linkage connected to the buoyant float, and a poppet valve including a lower poppet valve inlet, an upper poppet valve outlet, and a fluid passage between lower poppet valve inlet and the upper poppet valve outlet, wherein the gas discharge valve includes a first closure at the lower poppet valve inlet arranged to sealingly close against a valve seat on the pivotal lever linkage and a second closure at an upper end of the poppet valve arranged to sealingly close against a valve seat at the valve body upper outlet.

7. The system of claim 1, wherein the gas discharge valve includes a closure responsive to different levels of force resulting from water on the process water fluid flow path and from gas on the process water fluid flow path.

8. The system of claim 1, wherein the gas discharge valve includes a closure connected to an actuator comprising a hygroscopic material that swells in response to contact with process water on the process water fluid flow path.

9. The system of claim 1, further comprising a heater or a first heat exchanger including a heat absorption side in operative fluid communication with the process water fluid flow path.

10. The system of claim 9, further comprising a second heat exchanger including a heat rejection side in operative fluid communication with the process water fluid flow path and a heat absorption side in operative thermal communication with a heat sink.

11. The system of claim 10, wherein the gas outlet receives process water discharged from the heater or first heat exchanger, and the heat rejection side inlet of the second heat exchanger receives process water from a process water fluid flow path side of the gas outlet.

12. The system of claim 1, further comprising a second heat exchanger including a heat rejection side in operative fluid communication with the process water fluid flow path and a heat absorption side in operative thermal communication with a heat sink.

13. The system of claim 1, comprising a plurality of said electrochemical cells in a stack separated by electrically-conductive fluid flow separators.

* * * * *